United States Patent [19]

Baker

[11] Patent Number: 4,790,633
[45] Date of Patent:* Dec. 13, 1988

[54] LIQUID CRYSTAL SWITCHING APPARATUS

[75] Inventor: Anthony P. Baker, New York, N.Y.

[73] Assignee: ITT Defense Communications, a Division of ITT Corporation, Nutley, N.J.

[*] Notice: The portion of the term of this patent subsequent to Nov. 15, 2005, has been disclaimed.

[21] Appl. No.: 913,875

[22] Filed: Sep. 30, 1986

[51] Int. Cl.⁴ .............................................. G02F 1/133
[52] U.S. Cl. ............................ 350/347 V; 350/96.14; 350/347 R
[58] Field of Search ............... 350/96.13, 96.14, 96.15, 350/347 R, 347 V

[56] References Cited

U.S. PATENT DOCUMENTS 2,403,731  7/1946  MacNeille .......................... 350/395
4,278,327  7/1981  McMahon et al. ............. 350/347 V

OTHER PUBLICATIONS

Born et al, Principles of Optics, 2nd Ed., MacMillan Company, New York (1964), p. 43.
R. A. Soref, "Fiber-Optic Switching with Liquid Crystals", *Guided Wave Optical Systems and Devices II*, Spie, vol. 176 (Apr. 1979), pp. 124–132.

*Primary Examiner*—John K. Corbin
*Assistant Examiner*—Martin Lerner
*Attorney, Agent, or Firm*—Robert A. Walsh; Thomas N. Twomey; Mary C. Werner

[57] ABSTRACT

A liquid crystal switching apparatus includes a plurality of juxtaposed liquid crystal switching devices, each such device being capable of selectively reorienting the polarization of a polarized light beam component incident thereupon.

16 Claims, 3 Drawing Sheets

LIQUID CRYSTAL SWITCHING APPARATUS

BACKGROUND OF THE INVENTION

The present invention generally relates to a liquid crystal switching apparatus and, in particular, relates to one such apparatus including a plurality of juxtaposed liquid crystal switching devices.

The demand for optical switches has become readily apparent to the optical industry in recent years due to the rapid and continued expansion of the use of optical fibers for carrying information. One major field that is inexorably moving to the use of optical fibers is telecommunications. Most applications in telecommunications require the use of a substantial number of optical switches. Hence, it becomes highly desirable to reduce not only the cost of each switch, but also to reduce the cost and complexity for developing a switching matrix that is capable of interconnecting a plurality of subscribers both between themselves and with an external transmission medium.

Recently, optical switching devices utilizing liquid crystal material to selectively redirect the path of a light beam have been suggested.

In early versions of such optical switches, a liquid crystal material was sandwiched between a pair trapezoidal prisms. Various arrangements and configurations of this type of liquid crystal optical switches are described and discussed in U.S. Pat. No. 4,201,442 issued to McMahon et al. on May 6, 1980, U.S. Pat. No. 4,278,327 issued McMahon et. al. on July 14, 1981, and U.S. Pat. No. 4,385,799 issued to Soref on May 31, 1983. Each of the individual switch designs described in the above-referenced U.S. Patents requires at least one pair of matched trapezoidal prisms in addition to sophisticated optical collimators. The trapezoidal prisms, as well as the collimators, are quite expensive. Further, the assembly of such switches requires accurate alignment of the various parts thereof to ensure optical path accuracy. In addition to the expense of the materials and the necessary accuracy for the optical alignment, the devices generally exhibit considerable internal reflections unless the indexes of refraction of the prism materials, the electrodes, and the liquid crystal material are accurately matched.

More recently, liquid crystal switches and devices have been described and discussed in the following co-pending U.S. patent applications Ser. Nos.: 795,156; 795,151; 795,152; 795,150; 795,155; 795,138; 795,148; 795,157; 795,154; 795,149; 795,296 all filed on Nov. 11, 1985 and assigned to the assignee hereof.

One of the major advantages of the devices described in these applications is that they can be manufactured from rather inexpensive material by relatively conventional fabrication techniques, such as, plastic injection molding techniques.

However, the above discussed devices do not generally provide a unitary, or bulk, arrangement particularly adapted for configuring a switch matrix.

Consequently, in order to enhance both the applicability and to further realize the inherent advantages of liquid crystal switching devices, a liquid crystal switching apparatus having a plurality of liquid crystal switching devices that can be readily configured into a switching matrix is needed to maximize the usefulness of such devices within an optical fiber based signaling system.

SUMMARY OF THE INVENTION

Accordingly, it is one object of the present invention to provide a liquid crystal switching apparatus that substantially overcomes the above discussed drawbacks.

This object is accomplished, at least in part, by a liquid crystal switching apparatus having a plurality of juxtaposed liquid crystal switching devices.

Other objects and advantages will become apparent to those skilled in the art from following detailed description read in conjunction with the appended claims and the drawing attached hereto.

DETAILED DESCRIPTION OF THE INVENTION

Figure 1:
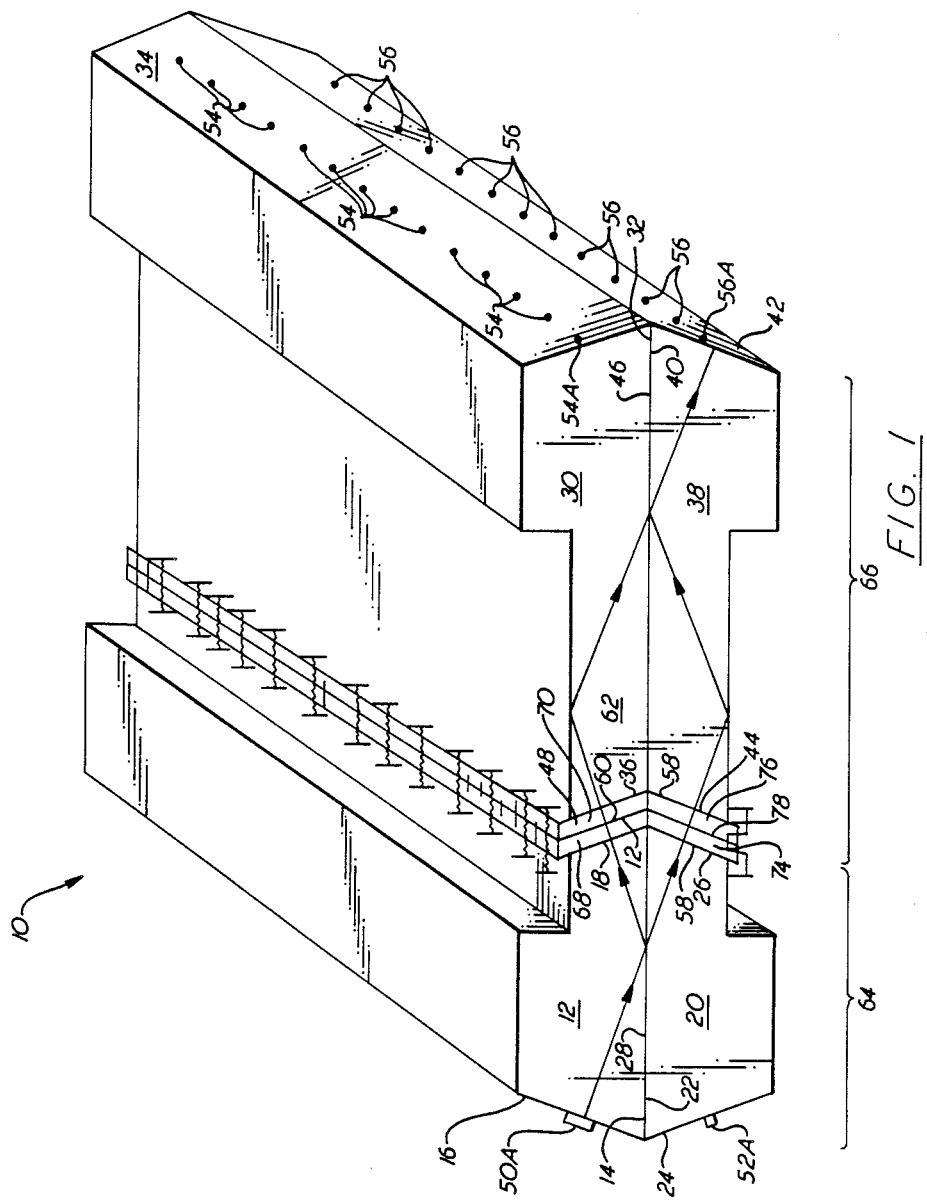
FIG. 1 is a pictorial view, not drawn to scale, of a liquid crystal switching apparatus embodying the principles of the present invention.

A liquid crystal switching apparatus, generally indicated at 10 in FIG. 1 and embodying the principles of the present invention, includes a first elongated transparent member 12 having a first planar surface 14 and first and second end surfaces, 16 and 18, respectively, extending therefrom, a second elongated transparent member 20 having a second planar surface 22 and first and second end surfaces, 24 and 26, respectively, extending therefrom, a first layer 28 of liquid crystal material disposed between the first and second planar surfaces, 14 and 22, respectively, of the first and second elongated transparent members, 12 and 20, respectively, a third elongated transparent member 30 having a third planar surface 32 and a first and second end surfaces, 34 and 36, respectively, extending therefrom, and a fourth elongated transparent member 38 having a fourth planar surface 40 and first and second end surfaces, 42 and 44, respectively, extending therefrom, a second layer 46 of liquid crystal material disposed between the third and fourth planar surfaces, 32 and 40, respectively, of the third and fourth elongated transparent members, 30 and 38, respectively, and means 48, disposed between the second end surfaces, 18, 26, 36 and 44 of the transparent members 12, 20, 30 and 38, respectively, for controllably reorienting the polarization of a plurality of light beams incident thereupon.

The liquid crystal switching apparatus 10, preferably, further includes first, second, third and fourth pluralities of ports, 50, 52, 54 and 56, respectively, disposed on each of the first end surfaces, 16, 24, 34 and 42, respectively, of the elongated transparent members, 12, 20, 30 and 38, respectively. The pluralities of ports 50, 52, 54 and 56, are substantially identically disposed on each of the first end surfaces, 16, 24, 34 and 42, respectively, such that correspondingly located ones of the pluralities of ports, for example, 50A, 52A, 54A and 56A, lie in a single plane. That is, each set of four ports, one from each of the pluralities of ports 50, 52, 54 and 56, are cooperatively disposed in a single plane taken substantially perpendicular to the planar surfaces, 14, 22, 32 and 40. In addition, the polarization reorienting means 48 includes an equal plurality of means 58 for establishing an electromagnetic field in a layer 60 of liquid crystal material associated with the means 48 for reorienting the polarization. The means 58 generally include sets of electrodes that are also disposed across the polarization reorienting means 48 such that each member of the means 58 lies in one of the respective planes of the ports, 50, 52, 54 and 56.

A plurality of juxtaposed liquid crystal switching devices 62 are, thus, effectively defined by each set of four ports, e.g. 50A, 52A, 54A, 56A, and a set of electromagnetic field establishing means 58. The apparatus 10 thus includes a first segment 64 including the first and second elongated transparent members, 12 and 20, respectively, defining a plurality of juxtaposed means for splitting an incident light beam thereupon. The number of such means, in this embodiment, being equal to the number of juxtaposed liquid crystal switching devices 62 defined. In addition, the third and fourth elongated transparent members, 30 and 38, respectively, effectively constitute a second segment 66 defining a plurality of juxtaposed means for recombining the polarized components of the incident light beam.

As shown in FIG. 1, the plurality of polarization reorienting means 48 can, in this embodiment, include first and second elongated glass slides, 68 and 70, respectively, having, for example, a third layer 72 of nematic liquid crystal material disposed therebetween and third and fourth elongated glass slides, 74 and 76, respectively, having a fourth layer 78 of nematic liquid crystal material disposed therebetween, the third and fourth layers, 72 and 78, respectively, of liquid crystal material can, in this embodiment, be common to all of the defined liquid crystal switching devices 62. In this embodiment, the sets of electrodes 60 are disposed on the surfaces of the slides, 68, 70, 74, and 76, proximate the layers, 72 and 78, respectively, of liquid crystal material.

Figure 2:
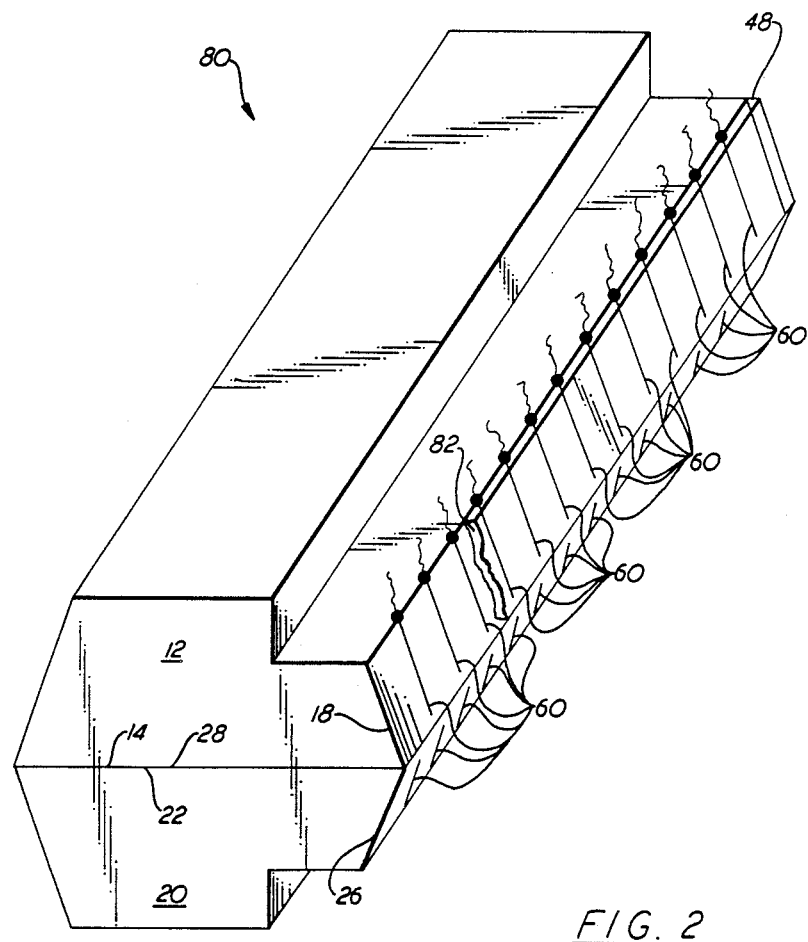
FIG. 2 is a perspective view, not drawn to scale, of one segment of a liquid crystal switching apparatus embodying the principles of the present invention.

In the liquid crystal switching apparatus 10, embodying the principles of the present invention, the use of elongated glass slides to define the polarization reorienting cells is not always necessary. A segment of an apparatus 10 wherein the glass slides are omitted, is generally indicated at 80 in FIG. 2, wherein indicia previously used are repeated to identify similar elements herein. As shown, the first and second elongated transparent members, 12 and 20, respectively, are provided with a first layer 28 of liquid crystal material between the planar surfaces, 14 and 22, respectively, thereof and the sets of electrodes 60 are formed on the second end surfaces, 18 and 26, respectively, of the first and second elongated transparent members, 12 and 20, respectively. Preferably, the sets of electrodes 60 are covered by a layer 82 of isolating material, for example, a polymide, on the order of about 100 Angstroms thick. The polymide layer 82, is shown in FIG. 2 in a cut-away view.

In such an apparatus 10, the means 48 for polarization reorganization can be formed by known techniques, such as deposition and etching to define the sets of electrodes 60. In addition, conventional sputtering techniques can be employed to form the polymide layer 82. To avoid undesireable molecular perturbations, the isolating layer 82 is preferably smooth, i.e., without any significant perturbations in the surface flatness at the molecular level and can be formed from such things as a silicon dioxide or any polymide.

In the preferred embodiment, in order to avoid the need for a molecular orienting surfactant, the means 48 for polarization reorientation are disposed such that the polarized components of an incident light beam impinge normal to the plane of the second end surfaces, 18 and 26. The particular voltages and operation of each liquid crystal switching device formed, or defined, within the liquid crystal switching apparatus 10, shown in FIGS. 1 and 2, is fully described and discussed in U.S. patent application Ser. No. 913,875 entitled LIQUID CRYSTAL SWITCHING DEVICE filed on even date herewith and assigned to the assignee hereof. This application is deemed incorporated herein by reference.

In essence, each of the liquid crystal switching devices 62 operates independently, that is, the path of light beams transversing each device 62 is effectively controlled by the particular set of electrodes associated with the post defining the inputs and outputs of that device. The independent operation of each device 62, and hence the effective fabrication of the bulk apparatus 10 stems from the fact that the phenomena relied upon to effect the operation of each device 62, i.e. the reorientation of the molecules of the layers 72 and 78, of liquid crystal material, is localized. Consequently, the individual voltages applied to each set of electrodes has a negligible effect on that portion of the layer of 72 or 78, of liquid crystal material composing the polarizating reorientation means 48 of adjacent devices. Typically, this effective isolation between adjacent devices can be accomplished by disposing the devices on about 3 millimeter centers.

As depicted by the ray diagram in the apparatus 10, each device 62 directs an incident light beam to the first layer 28 of liquid crystal material that functions as a beam splitter. Thus, the incident light beam is split into the plane polarized components thereof. The plane polarized components next traverse the polarization reorientation means 48 whereby the effective polarization thereof may be reoriented as desired. The beam components are then recombined in the recombining segment 66 and directed to one of the output ports, 54 or 56.

Figure 3:
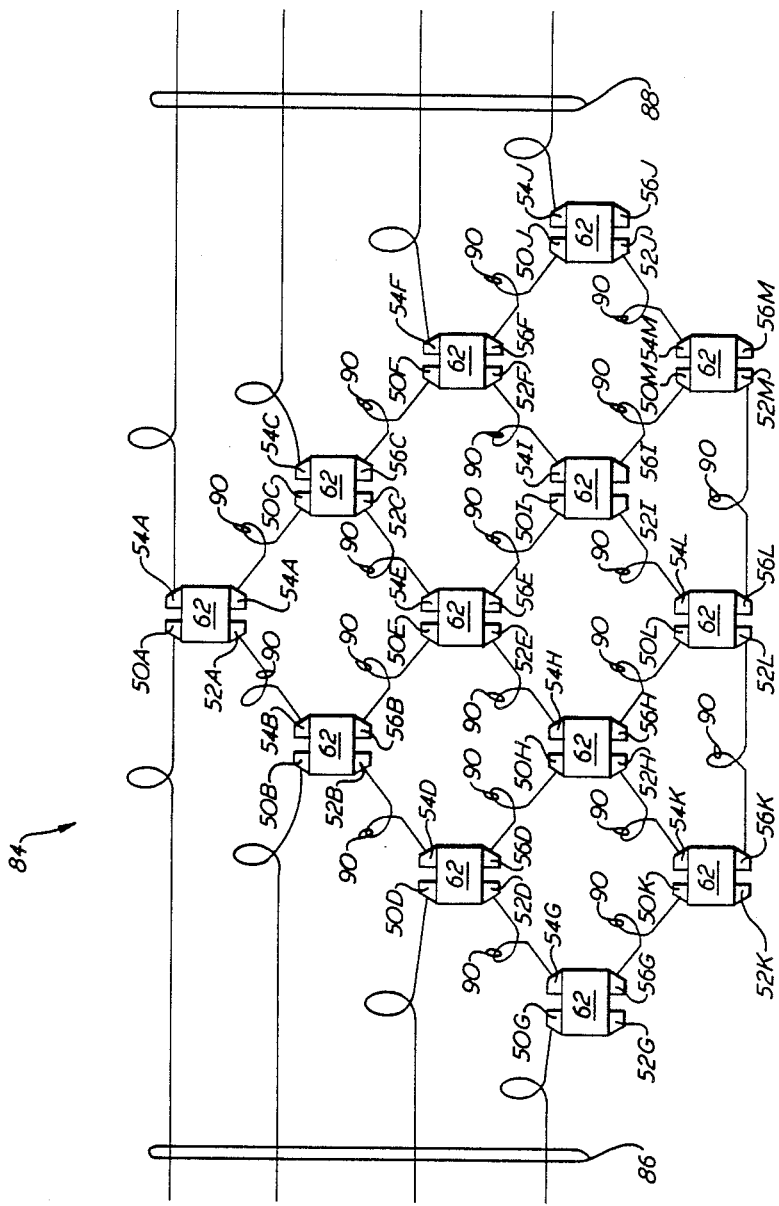
FIG. 3 is a schematic of a matrix interconnection employing a liquid crystal switching apparatus embodying the principles of the present invention.

A non-blocking switching matrix, generally indicated at 84 in FIG. 3 and utilizing a liquid crystal switching apparatus 10 embodying the principles of the present invention, includes thirteen (13) juxtaposed liquid crystal switching devices 62 interconnected to provide first and second pluralities, 36 and 88, respectively, of input/output ports. As used herein, the phrase "non-blocking" as well as the idiomatic equivalents, refers to the characteristic of the switching matrix 84 that ensures that, so long as one input port thereof is available and one output port thereof is available, a connection therebetween can be established regardless of the previously established communication paths through the switching matrix 84.

The switching matrix 84 shown in FIG. 3 can be readily implemented by interconnecting the various ports, 50, 52, 54, and 56, of the apparatus 10 with optical fibers 90 with, of course, the exception of the first and second pluralities of input/output ports, 86 and 88, respectively. Such a switching matrix 84 is also commonly referred to as 4x4 full duplex, i.e., bidirectional, switching matrix.

In one embodiment, the material of the transparent members, 12, 20, 30 and 38, is Schott WG 360 glass and the nematic liquid crystal is preferably EM 1132 available from E. Merck of Rahway, N.J. Typically, with each defined liquid crystal switching device 62 being spaced on about 3 millimeter centers, the overall depth of the apparatus 10 is on the order of about 39 millimeters.

Although the present invention has been described and discussed with respect to specific embodiments, other arrangements and configurations may also be developed that, nevertheless, do not depart from the spirit and scope of the present invention. Hence, the present invention is deemed limited only by the appended claims and the reasonable interpretation thereof.

What is claimed is:

1. A liquid crystal switching apparatus, comprising:
   a plurality of juxtaposed liquid crystal switching devices, each said device including a beam splitter segment for splitting an incident light beam into polarized components, said beam splitting segment having a first layer of liquid crystal material common thereto;
   wherein each said device further comprises:
   a beam combiner segment for recombining said polarized components into a single beam, said beam combiner segments having a second layer of liquid crystal material common thereto; and
   means for selectively reorienting the polarization of said polarized components, each said means being disposed between said beam splitter segment and said beam combiner segment of each said device, said apparatus having a third layer of liquid crystal material common to said polarization reorientation means.

2. Apparatus as claimed in claim 1 wherein each said polarization reorientation means is disposed normal to said polarized components impinging thereupon from said beam splitting segment.

3. Apparatus as claimed in claim 1 wherein each said polarization reorientation means includes:
   means for creating an electromagnetic field in said third layer of liquid crystal material, each said electromagnetic field creating means being associated with one of said plurality of juxtaposed devices.

4. Apparatus as claimed in claim 3 wherein each said juxtaposed device further comprises:
   a first and a second input port; and
   a first and a second output port, said input and output ports and said electromagnetic field creating means lying in a single plane substantially perpendicular to said planar surfaces.

5. A liquid crystal switching apparatus, comprising:
   a plurality of juxtaposed liquid crystal switching devices, each said device including a beam splitter segment for splitting an incident light beam into polarized components, said beam splitting segment having a first layer of liquid crystal material common thereto;
   a plurality of first input ports;
   first and second pluralities of output ports, each one of said first input ports and one of each said pluralities of output ports being associated with each said device; and
   wherein each said device further comprises:
   a beam combiner segment for recombining said polarized components into a single beam, said beam combiner segments having a second layer of liquid crystal material common thereto.

6. Apparatus as claimed in claim 5 further comprises:
   a plurality of second input ports each said second input port being associated with one of said devices.

7. A liquid crystal switching apparatus, comprising:
   a plurality of juxtaposed liquid crystal switching devices, each said device including a beam splitter segment for splitting an incident light beam into polarized components, said beam splitting segment having a first layer of liquid crystal material common thereto;
   wherein said beam splitter segments further comprises:
   a first elongated transparent member having a first planar surface;
   a second elongated transparent member, said second elongated transparent member having a second planar surface, said first and second elongated transparent members having said first layer of liquid crystal material disposed between said first and second planar surfaces thereof; and
   wherein each said device further comprises:
   a beam combiner segment for recombining said polarized components into a single beam, said beam combiner segments having a second layer of liquid crystal material common thereto.

8. Apparatus as claimed in claim 7 further comprises:
   a beam combiner segment for recombining said polarized components into a single beam, said combiner segments having a second layer of liquid crystal material common thereto.

9. Apparatus as claimed in claim 8 wherein said beam combiner segments further comprises:
   a third elongated transparent member having a third planar surface; and
   a fourth elongated transparent member having a fourth planar surface, said third and fourth elongated transparent members having said second layer of liquid crystal material disposed between said third and fourth planar surfaces thereof.

10. A liquid crystal switching apparatus comprises:
    a first elongated transparent member, said first elongated transparent member having a first planar surface and first and second end surfaces extending therefrom;
    a second elongated transparent member having a second planar surface and first and second end surfaces extending therefrom;
    a first layer of liquid crystal material, said first layer of liquid crystal material being disposed between said first and second planar surfaces;
    a plurality of ports, said ports being disposed on said first end surfaces of said first and second elongated transparent members whereby a plurality of beams can be split into polarized components; and
    means, disposed substantially perpendicular to said second surfaces, for reorienting the polarization of light beams incident normal thereto and, said polarization reorientation means including a second layer of liquid crystal material disposed substantially parallel with said second end surfaces.

11. Apparatus as claimed in claim 10 further comprises:
    a third elongated transparent member having a third planar surface and first and second end surfaces extending therefrom;
    a fourth elongated transparent member having a fourth planar surface and first and second end surfaces extending therefrom, said second end surfaces being substantially parallel and proximate to said second layer of liquid crystal material; and a third layer of liquid crystal material disposed between said third and said fourth planar surfaces.

12. A liquid crystal switching matrix comprises:

a plurality of juxtaposed liquid crystal switching devices, each said device having first and second input ports and first and second output ports, said devices having at least one layer of liquid crystal material common thereto;

a plurality of matrix input/output ports, said matrix input/output ports being selected from said first and second input ports of said devices;

a plurality of matrix output/input ports, said matrix output/input ports being selected from said first and second output ports of said devices; and means for interconnecting the unselected first and second input ports and the unselected first and second output ports of said devices whereby signal paths can be established between said input/output ports and said output/input ports via said devices.

13. Matrix as claimed in claim 12 wherein each said device further comprises:

a beam splitter segment for splitting an incident light beam into the polarized components thereof, said beam splitting segments having a first layer of liquid crystal material common thereto.

14. Matrix as claimed in claim 13 wherein each said device further comprises:

a beam combiner segment for recombining said polarized components into a single beam, said beam combiner segments having a second layer of liquid crystal material common thereto.

15. Matrix as claimed in claim 14 wherein each said device further comprises:

means for selectively reorienting the polarization of said polarized components, each said means being disposed between said beam splitter segment and said beam combiner segment of each said device, said polarization reorientation means having a third layer of liquid crystal material common thereto.

16. Matrix as claimed in claim 15 wherein each said polarization reorientation means is disposed normal to said polarized components impinging thereupon from said beam splitting segment.

* * * * *